United States Patent
Kureishi et al.

(10) Patent No.: US 12,091,262 B2
(45) Date of Patent: Sep. 17, 2024

(54) ARTICLE SORTING DEVICE

(71) Applicant: IL PHARMA PACKAGING CO., LTD., Ichinomiya (JP)

(72) Inventors: Mitsuhiro Kureishi, Ichinomiya (JP); Hironori Iwamatsu, Ichinomiya (JP); Akira Sumitani, Ichinomiya (JP); Shinichi Tanaka, Ichinomiya (JP); Hiroyuki Ito, Ichinomiya (JP); Akiyoshi Ando, Ichinomiya (JP)

(73) Assignee: IL PHARMA PACKAGING CO., LTD., Aichi (JP)

( * ) Notice: Subject to any disclaimer, the term of this patent is extended or adjusted under 35 U.S.C. 154(b) by 0 days.

(21) Appl. No.: 18/252,567

(22) PCT Filed: Nov. 15, 2021

(86) PCT No.: PCT/JP2021/041950
§ 371 (c)(1),
(2) Date: May 11, 2023

(87) PCT Pub. No.: WO2022/107726
PCT Pub. Date: May 27, 2022

(65) Prior Publication Data
US 2024/0017939 A1    Jan. 18, 2024

(30) Foreign Application Priority Data

Nov. 17, 2020 (JP) .................................. 2020-190886

(51) Int. Cl.
B65G 47/84 (2006.01)
B07C 5/36 (2006.01)
(Continued)

(52) U.S. Cl.
CPC .............. *B65G 47/846* (2013.01); *B07C 5/36* (2013.01); *B65C 9/02* (2013.01); *B65G 47/71* (2013.01);
(Continued)

(58) Field of Classification Search
CPC ............ B07C 5/36; B65C 9/02; B65G 47/846
See application file for complete search history.

(56) References Cited

U.S. PATENT DOCUMENTS 3,975,260 A * 8/1976 Peyton .................... B07C 5/122
                                                                198/441
5,882,474 A * 3/1999 Gomes ...................... B65C 3/16
                                                                156/566

FOREIGN PATENT DOCUMENTS

EP    0356645 A1    3/1990
JP    S4728658 A    11/1972
(Continued)

OTHER PUBLICATIONS

International Search Report, and English Translation thereof, of International Application No. PCT/JP2021/041950, mail date Feb. 1, 2022, 5 pages.
(Continued)

*Primary Examiner* — Jacob S. Scott
*Assistant Examiner* — Miraj T. Patel
(74) *Attorney, Agent, or Firm* — Grossman, Tucker, Perreault & Pfleger, PLLC; Steven J. Grossman

(57) ABSTRACT

Provided is an article sorting device that can handle various containers without necessarily requiring a change of parts. The article sorting device includes a rotating table, a pocket, a guide, a position control unit, and a sorting unit. The position control unit controls a radial position of the pocket to a specified position that is a first position or a second position located radially outward relative to the first posi- (Continued)

tion. The sorting unit guides an article to different paths depending on whether the radial position of the pocket is at the first position or the second position when a circumferential position of the pocket reaches a sorting position.

9 Claims, 15 Drawing Sheets

(51) Int. Cl.
*B65C 9/02* (2006.01)
*B65G 47/71* (2006.01)

(52) U.S. Cl.
CPC ............ *B07C 2501/0063* (2013.01); *B65G 2201/0235* (2013.01)

(56) References Cited

FOREIGN PATENT DOCUMENTS

| JP | S61189020 U | 11/1986 |
|---|---|---|
| JP | 2002104346 A | 4/2002 |
| JP | 5566143 B2 | 8/2014 |
| JP | 2017100824 A | 6/2017 |
| JP | 2020153845 A | 9/2020 |

OTHER PUBLICATIONS

International Preliminary Report on Patentability and Written Opinion of the International Searching Authority, with English translation, of International Application No. PCT/JP2021/041950, mail date Jun. 1, 2023, 10 pages.

* cited by examiner

ARTICLE SORTING DEVICE

CROSS-REFERENCE TO RELATED APPLICATION

This international application claims the priority of Japanese Patent Application No. 2020-190886 filed on Nov. 17, 2020 with the Japan Patent Office, and the entire disclosure of Japanese Patent Application No. 2020-190886 is incorporated in this international application by reference.

TECHNICAL FIELD

The present disclosure relates to an article sorting device.

BACKGROUND ART

A labeling device is disclosed in Patent Document 1. The labeling device transports containers along a transport path. The labeling device attaches a label to a container in an attaching portion provided at a position in the transport path. Labeled containers are further transported along the transport path.

PRIOR ART DOCUMENTS

Patent Documents

Patent Document 1: Official Gazette of Japanese Patent No. 5566143

SUMMARY OF THE INVENTION

Problems to be Solved by the Invention

The containers that have passed through the attaching portion include containers with labels properly attached (hereinafter, referred to as "non-defective products") and containers with labels improperly attached (hereinafter, referred to as "defective products"). It is desirable that the labeling device is provided with an article sorting device that can sort articles into non-defective products and defective products.

There are various shapes and sizes of containers, to which the labeling device attaches labels. It is desirable that the article sorting device can handle various containers without requiring a change of parts.

In one aspect of the present disclosure, it is desirable to provide an article sorting device that can handle various containers without necessarily requiring a change of parts.

Means for Solving the Problems

One aspect of the present disclosure is an article sorting device. The article sorting device comprises a rotating table, a pocket mounted to an outer circumferential portion of the rotating table such that a radial position of the pocket is changeable and configured to be able to hold an article, a guide located radially outward relative to the pocket and configured to inhibit the article from falling from the pocket, a position control unit configured to control the radial position of the pocket to a specified position that is a first position or a second position located radially outward relative to the first position from when a circumferential position of the pocket passes an introduction position where the article is introduced into the pocket to when the position reaches a sorting position, and a sorting unit configured to guide the article to different paths depending on whether the radial position of the pocket is at the first position or the second position when the circumferential position of the pocket reaches the sorting position.

The article sorting device according to one aspect of the present disclosure can sort various articles without necessarily requiring a change of parts.

EXPLANATION OF REFERENCE NUMERALS

1 . . . labeling system, 3 . . . container introduction device, 5 . . . transport device, 7 . . . labeling device, 9 . . . article sorting device, 11 . . . horizontal supply conveyor, 13 . . . robot, 17 . . . passage for defective products, 19 . . . table for non-defective products, 21 . . . rail unit, 23 . . . holding unit, 25 . . . first guide, 25A . . . side plate, 25B . . . bottom plate, 27 . . . upper rail, 29 . . . lower rail, 31 . . . upper chain, 33 . . . lower chain, 35 . . . groove, 37, 39 . . . path switching rail, 41 . . . first air cylinder, 43 . . . second air cylinder, 47 . . . third air cylinder, 49 . . . fourth air cylinder, 451 . . . first stopper, 452 . . . second stopper, 453 . . . third stopper, 454 . . . fourth stopper, 51 . . . shaft, 53 . . . slide portion, 55 . . . roller support portion, 57A, 57B . . . upper roller, 59A, 59B . . . lower roller, 61 . . . cam follower, 63, 65 . . . support plate, 65A, 65B, 67A, 67B . . . roller shaft, 71 . . . rotating table, 73 . . . pocket, 73A . . .

concave, 75 . . . top plate, 77 . . . support post, 79 . . . rail, 81 . . . block, 83 . . . spring guide, 85 . . . spring, 87 . . . spring receiving portion, 87A . . . guide receiving hole, 89 . . . cam follower, 91 . . . cam, 93, 93A, 93B, 93C . . . contacting surfaces, 97 . . . gap, 99 . . . selection portion, 101 . . . container, 103 . . . second guide, 105 . . . sorting position, 106 . . . gap

MODE FOR CARRYING OUT THE INVENTION

Example embodiments of the present disclosure will be described with reference to drawings.

First Embodiment

1. Configuration of Labeling System 1

Figure 1:
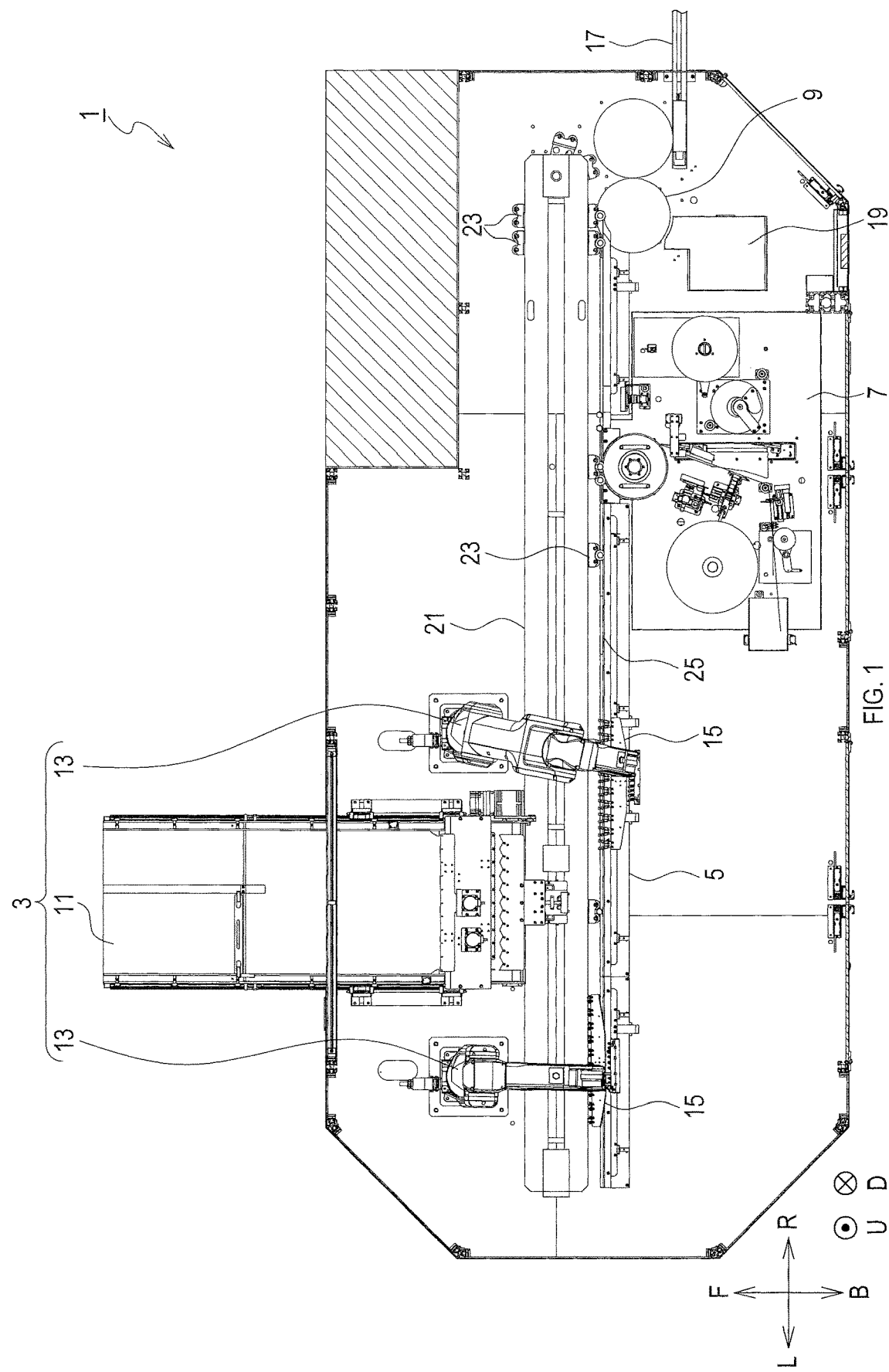
FIG. 1 is a horizontal cross-sectional view illustrating a configuration of a labeling system 1.

A configuration of a labeling system 1 will be described based on FIG. 1. The labeling system 1 is a system that attaches labels to containers. The containers correspond to objects. The right direction in FIG. 1 is referred to as a direction R, the left direction in FIG. 1 is referred to as a direction L, the downward direction in FIG. 1 is referred to as a direction B, the upward direction in FIG. 1 is referred to as a direction F, a direction orthogonal to the plane of paper in FIG. 1 and toward a viewer is referred to as a direction U, and a direction orthogonal to the plane of paper in FIG. 1 and away from the viewer is referred to as a direction D. The direction U is a vertically upward direction. The direction D is a vertically downward direction.

The labeling system 1 comprises a container introduction device 3, a transport device 5, a labeling device 7, and an article sorting device 9.

The container introduction device 3 comprises a horizontal supply conveyor 11 and two robots 13. A worker puts unlabeled containers on the horizontal supply conveyor 11. The horizontal supply conveyor 11 feeds the containers in the direction B. At the end of the horizontal supply conveyor 11 on the direction B side, ten containers are lined up in a row along the directions R, L. Each robot 13 introduces ten containers at a time to an introduction position 15 in the transport device 5.

The transport device 5 transports the containers from the introduction positions 15 in the direction R. The labeling device 7 attaches labels to the containers being transported. The transport device 5 further transports the containers to which labeling has been completed (hereinafter, referred to as labeled containers) in the direction R.

The article sorting device 9 sorts the transported labeled containers into non-defective products and defective products. Non-defective products mean containers with properly attached labels. Defective products mean containers with improperly attached labels. The article sorting device 9 sends the defective products to a passage 17 for defective products. The article sorting device 9 sends the non-defective products onto a table 19 for non-defective products.

2. Configuration of Transport device 5

A configuration of the transport device 5 will be described based on FIG. 1 to FIG. 12. The transport device 5 comprises a rail unit 21, two or more holding units 23, and a first guide 25.

Figure 2:
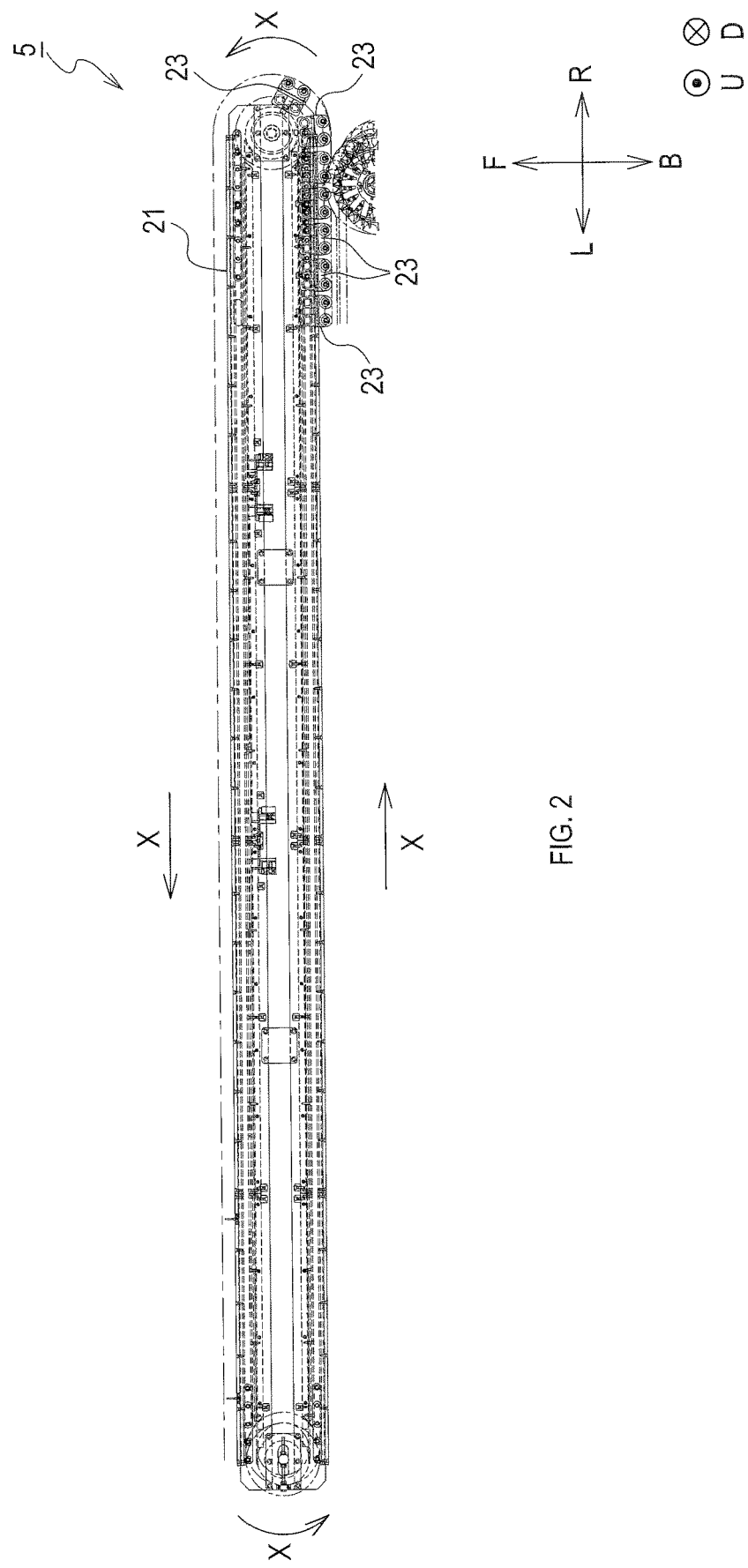
FIG. 2 is a plan view illustrating a configuration of a transport device 5.

As illustrated in FIG. 2, the rail unit 21, when seen from a viewpoint on the direction U side, has an annular shape elongated in the directions R, L.

Figure 3:
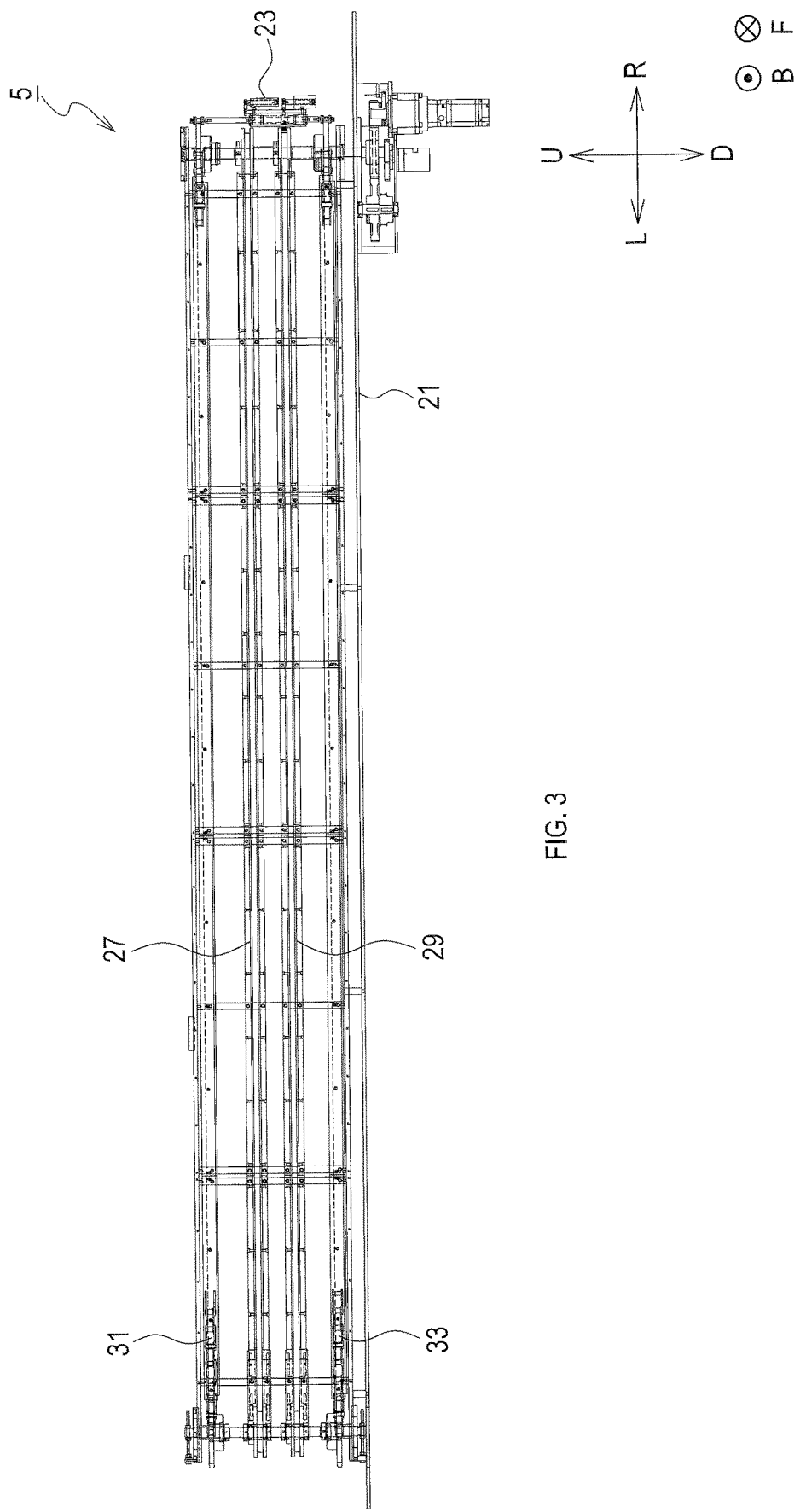
FIG. 3 is a side view illustrating a portion of the transport device 5 on a direction B side.
Figure 4:
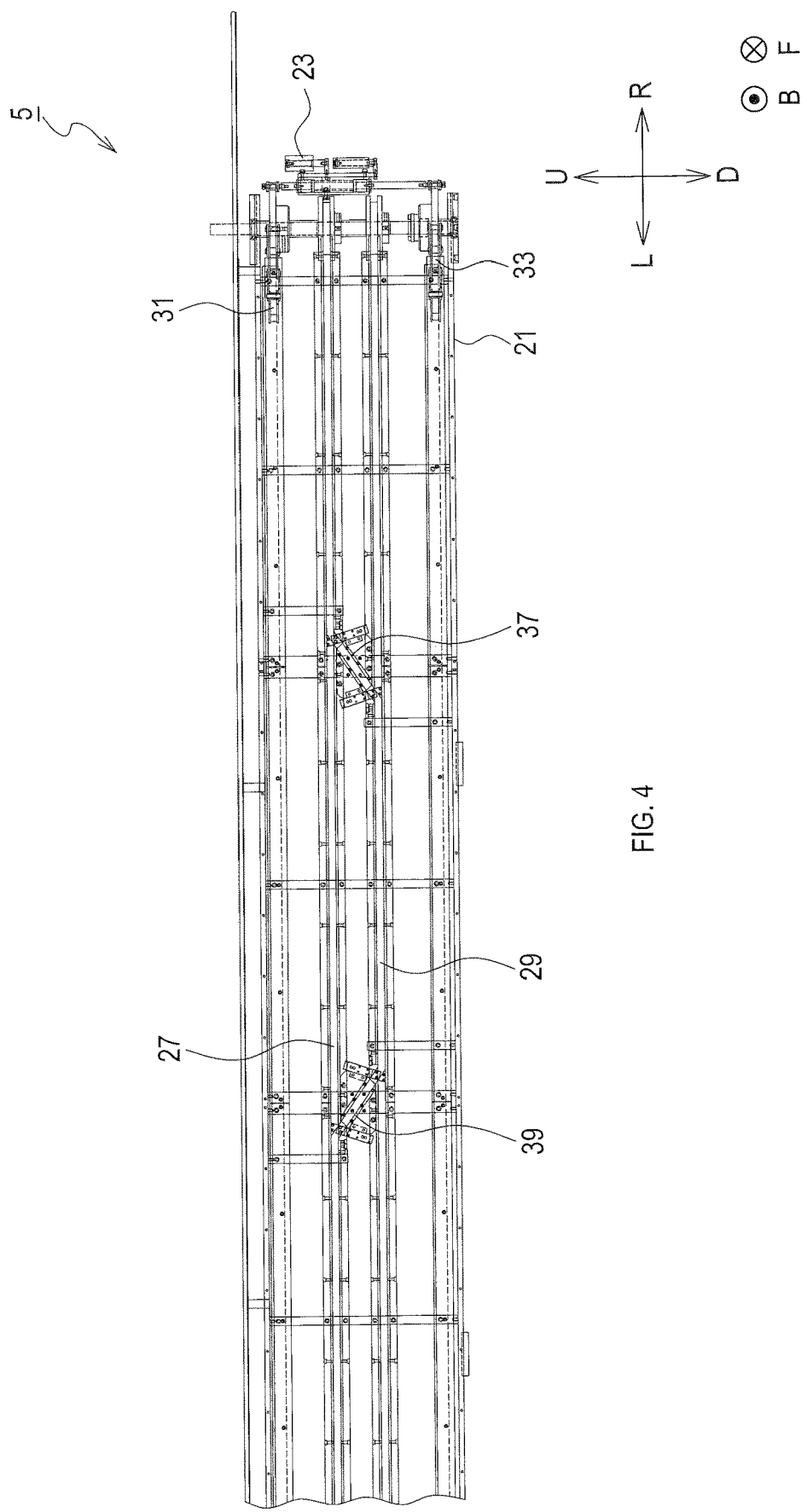
FIG. 4 is a side view illustrating a portion of the transport device 5 on a direction F side.

As illustrated in FIG. 3 and FIG. 4, the rail unit 21 comprises an upper rail 27, a lower rail 29, an upper chain 31, and a lower chain 33. Each of the upper rail 27, the lower rail 29, the upper chain 31, and the lower chain 33 extends along a circumferential direction of the annular rail unit 21. Each of the upper rail 27, the lower rail 29, the upper chain 31, and the lower chain 33 extends in the horizontal direction.

The upper chain 31 is arranged farthest on the direction U side in the rail unit 21. The upper rail 27 is arranged on the direction D side of the upper chain 31. The lower rail 29 is arranged on the direction D side of the upper rail 27. The lower chain 33 is arranged on the direction D side of the lower rail 29.

Figure 5:
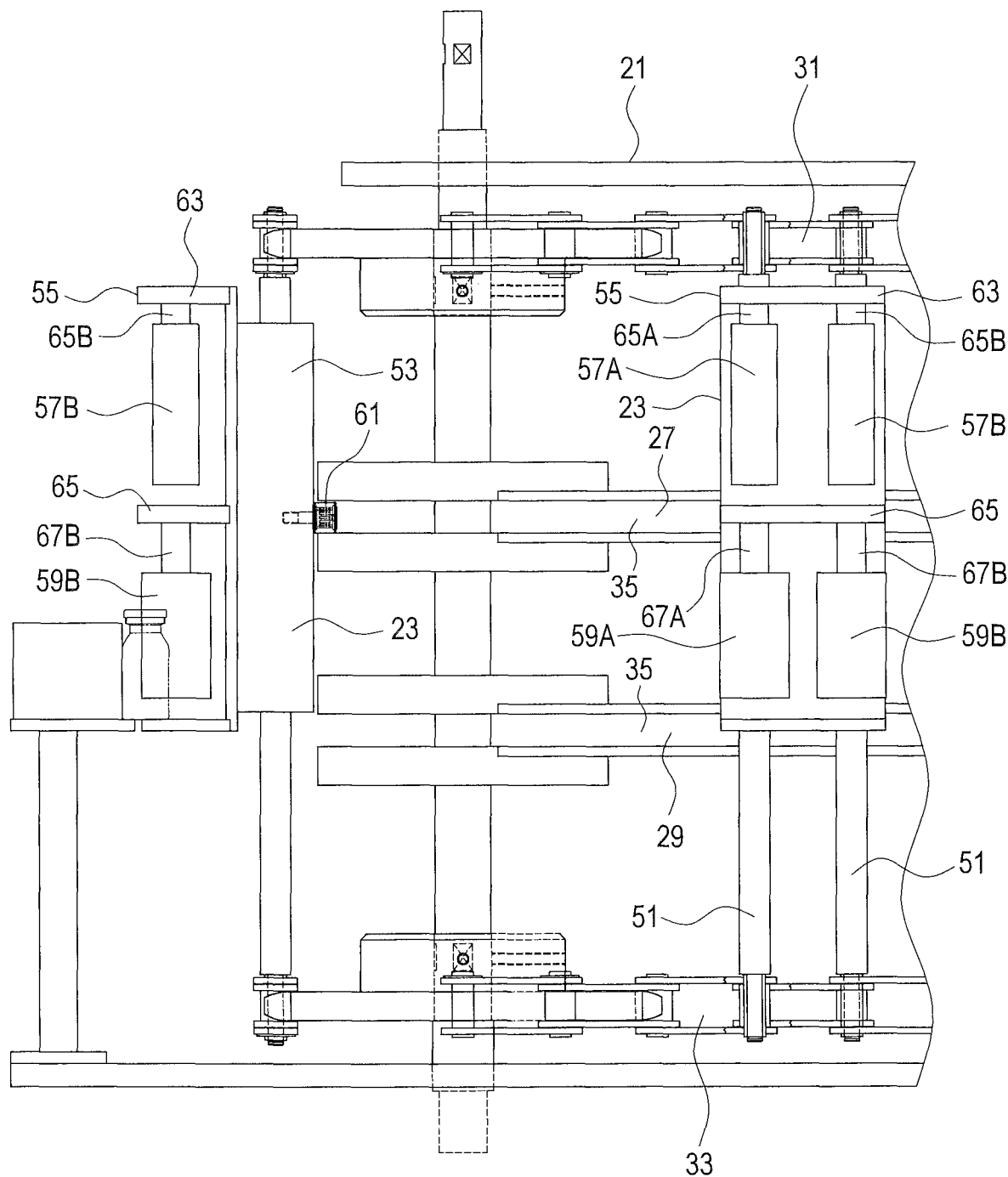
FIG. 5 is a side view illustrating a configuration of a rail unit 21 and a holding unit 23.
Figure 6:
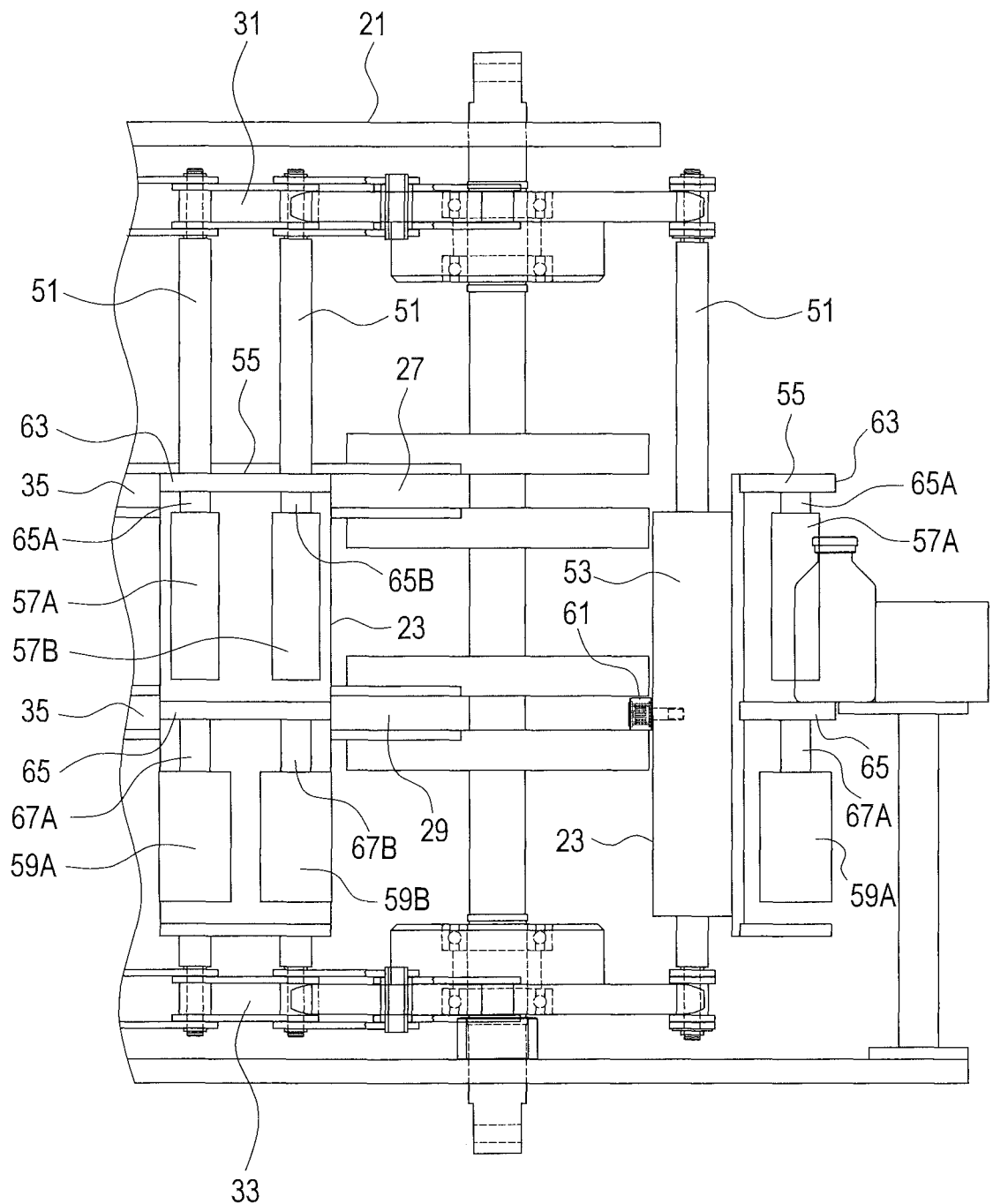
FIG. 6 is a side view illustrating a configuration of the rail unit 21 and the holding unit 23.

As illustrated in FIG. 5 and FIG. 6, the upper rail 27 is provided with a groove 35 having a recessed shape on an outer peripheral side. The outer peripheral side is, as illustrated in FIG. 2, a direction, when seen from a viewpoint on the direction U side, away from the center of the annular rail unit 21. The groove 35 extends along a longitudinal direction of the upper rail 27. The lower rail 29 is also provided with a groove 35 similarly to the upper rail 27.

As illustrated in FIG. 4, path switching rails 37, 39 are provided in portions of the rail unit 21 on the direction F side. The path switching rails 37, 39 connect the upper rail 27 and the lower rail 29. The path switching rail 37 is inclined in the direction D toward the end in the direction L. The path switching rail 39 is inclined in the direction U toward the end in the direction L.

Figure 10:
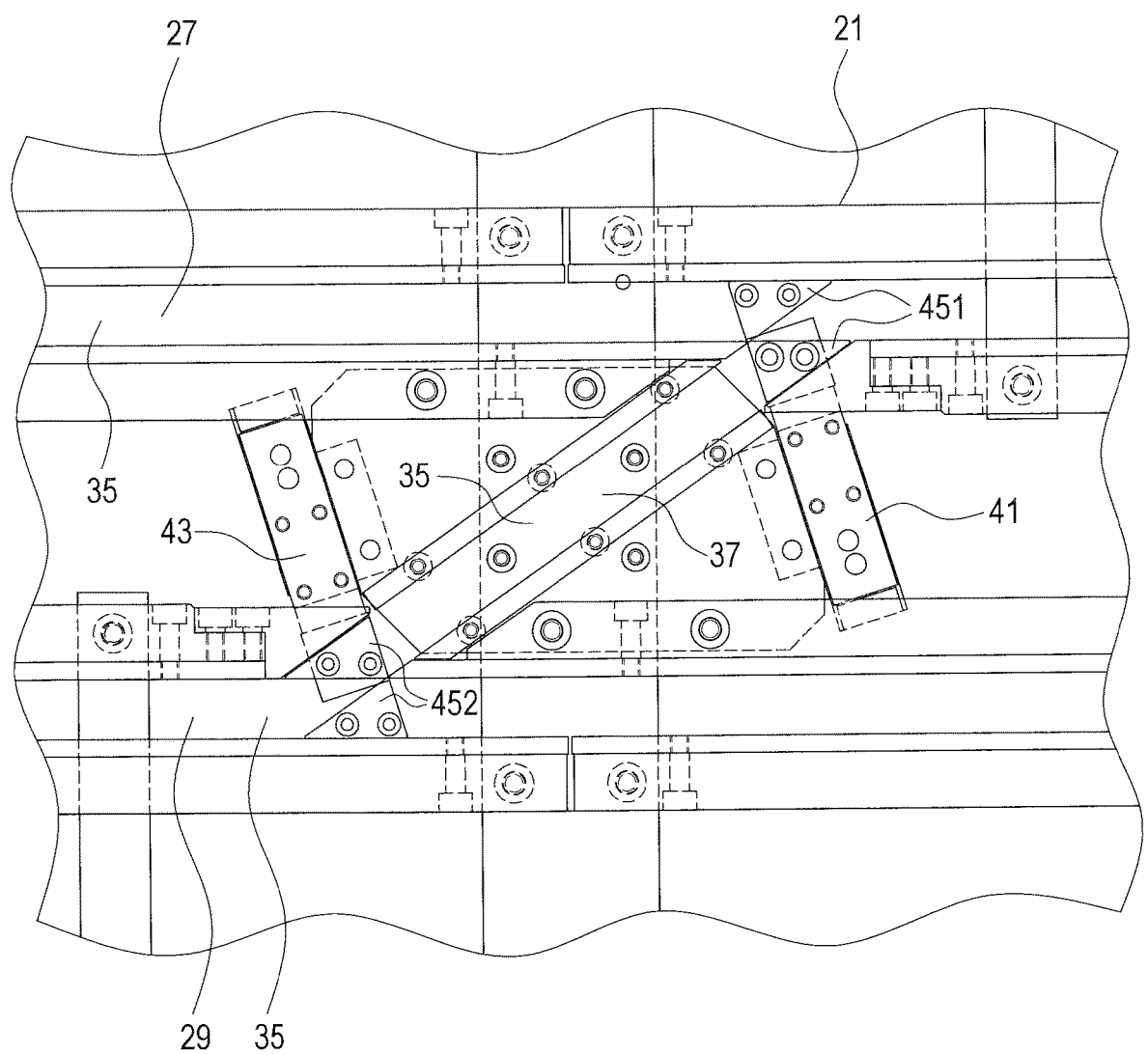
FIG. 10 is an explanatory view illustrating a configuration of a path switching rail 37.

As illustrated in FIG. 10, the path switching rail 37 is provided with a groove 35 similarly to the upper rail 27 and the lower rail 29. The groove 35 is provided on an outer peripheral side of the path switching rail 37. The groove 35 extends along a longitudinal direction of the path switching rail 37.

In the vicinity of an intersection between the path switching rail 37 and the upper rail 27, a first air cylinder 41 is provided. In the vicinity of an intersection between the path switching rail 37 and the lower rail 29, a second air cylinder 43 is provided.

The first air cylinder 41 can move a triangular first stopper 451. The position of the first stopper 451 is at either one of a position where the groove 35 of the upper rail 27 is closed and the groove 35 of the path switching rail 37 is opened, or a position where the groove 35 of the path switching rail 37 is closed and the groove 35 of the upper rail 27 is opened.

The second air cylinder 43 can move a triangular second stopper 452. The position of the second stopper 452 is at either one of a position where the groove 35 of the lower rail 29 is closed and the groove 35 of the path switching rail 37 is opened, or a position where the groove 35 of the path switching rail 37 is closed and the groove 35 of the lower rail 29 is opened.

Figure 11:
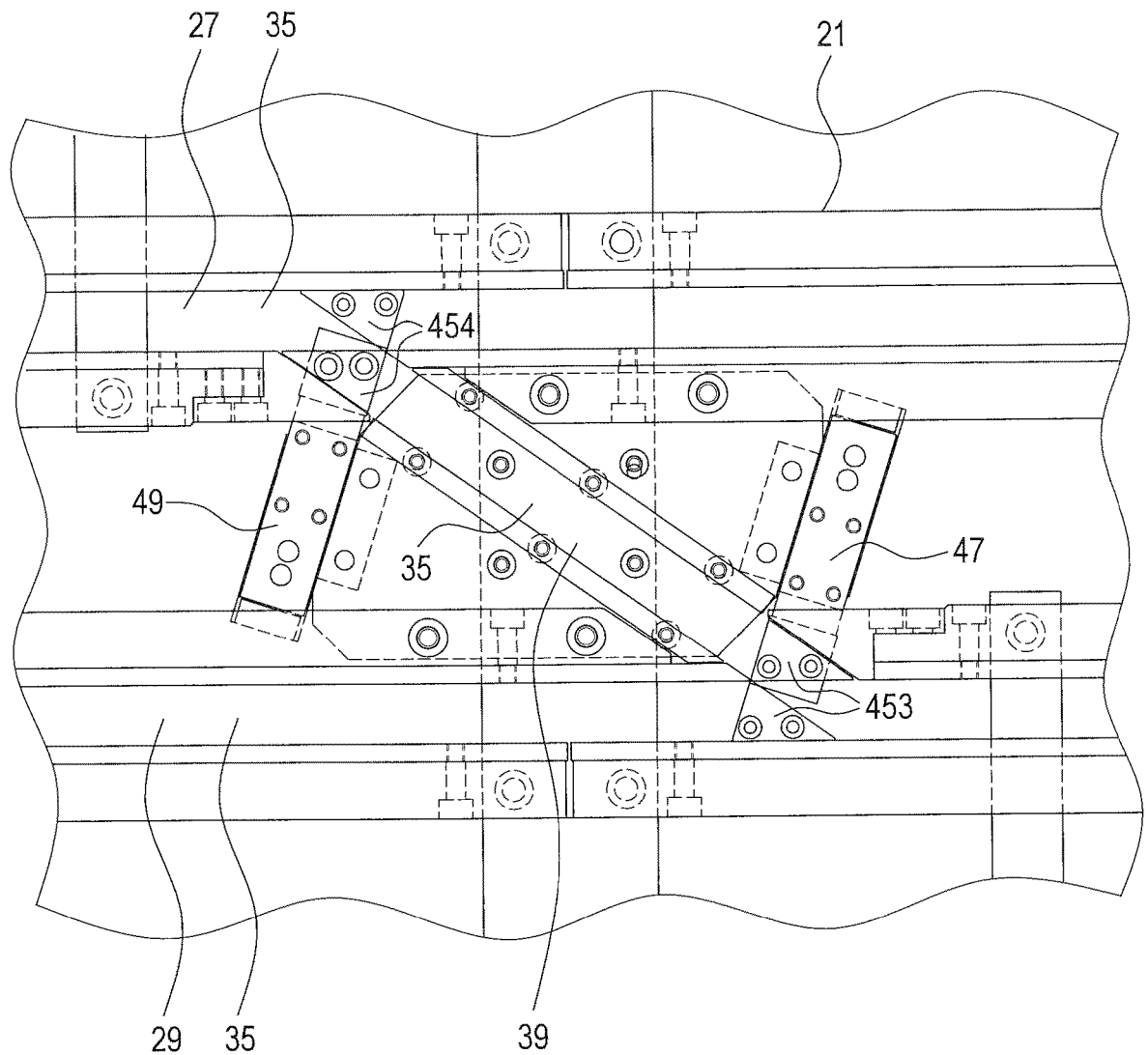
FIG. 11 is an explanatory view illustrating a configuration of a path switching rail 39.

As illustrated in FIG. 11, the path switching rail 39 is provided with a groove 35 similarly to the upper rail 27 and the lower rail 29. The groove 35 is provided on an outer peripheral side of the path switching rail 39. The groove 35 extends along a longitudinal direction of the path switching rail 39. In the vicinity of an intersection between the path switching rail 39 and the lower rail 29, a third air cylinder 47 is provided. In the vicinity of an intersection between the path switching rail 39 and the upper rail 27, a fourth air cylinder 49 is provided.

The third air cylinder 47 can move a triangular third stopper 453. The position of the third stopper 453 is at either one of a position where the groove 35 of the lower rail 29 is closed and the groove 35 of the path switching rail 39 is opened, or a position where the groove 35 of the path switching rail 39 is closed and the groove 35 of the lower rail 29 is opened.

The fourth air cylinder 49 can move a triangular fourth stopper 454. The position of the fourth stopper 454 is at either one of a position where the groove 35 of the upper rail 27 is closed and the groove 35 of the path switching rail 39 is opened, or a position where the groove 35 of the path switching rail 39 is closed and the groove 35 of the upper rail 27 is opened.

The upper chain 31 and the lower chain 33 are rotated by a driving force of a drive source, which is not shown, in a direction X illustrated in FIG. 2. In a portion of the rail unit 21 on the direction B side, the upper chain 31 and the lower chain 33 move in the direction R. The direction R corresponds to the transport direction. The speed of the upper chain 31 and the speed of the lower chain 33 are the same.

As illustrated in FIG. 5 and FIG. 6, the holding unit 23 comprises two shafts 51, a slide portion 53, a roller support portion 55, upper rollers 57A, 57B, lower rollers 59A, 59B, and a cam follower 61. The upper rollers 57A, 57B correspond to a first roller. The lower rollers 59A, 59B correspond to a second roller.

The two shafts 51 are arranged side by side at an interval along the direction X. The axial directions of the two shafts 51 are parallel to the directions U, D. The upper ends of the two shafts 51 are each secured to the upper chain 31. The lower ends of the two shafts 51 are each secured to the lower chain 33. When the upper chain 31 and the lower chain 33 rotate in the direction X, the two shafts 51 move in the direction X.

The slide portion 53 has two through holes extending parallel to the directions U, D. The shafts 51 are inserted in the through holes respectively. A bush is mounted inside the through hole. The bush is inserted outside of the shaft 51. Sliding movement between an inner circumferential surface of the bush and an outer circumferential surface of the shaft 51 enables the slide portion 53 to move in the directions U, D.

The roller support portion 55 is secured on an outer peripheral side of the slide portion 53. The outer peripheral side is, as illustrated in FIG. 2, in a direction, when seen from a viewpoint on the direction U side, away from the center of the annular rail unit 21. The roller support portion 55 comprises support plates 63, 65 projecting toward the outer peripheral side. The support plate 65 is arranged on the downward direction D side of the support plate 63.

From a lower surface of the support plate 63, roller shafts 65A, 65B extend in the downward direction D. The roller shafts 65A, 65B are arranged side by side along the direction X. From a lower surface of the support plate 65, roller shafts 67A, 67B extend in the downward direction D. The roller shafts 67A, 67B are arranged side by side along the direction X. The roller shaft 65A and the roller shaft 67A are arranged in a straight line. The roller shaft 65B and the roller shaft 67B are arranged in a straight line.

The upper roller 57A is rotatably mounted to the roller shaft 65A. The axial direction of the upper roller 57A is parallel to the directions U, D. The upper roller 57B is rotatably mounted to the roller shaft 65B. The axial direction of the upper roller 57B is parallel to the directions U, D. The upper rollers 57A, 57B are arranged side by side at an interval along the direction X. The positions of the upper rollers 57A, 57B in the directions U, D are the same. The shapes of the upper rollers 57A, 57B are cylindrical. The diameters of the upper rollers 57A, 57B are the same. The lengths of the upper rollers 57A, 57B in the axial direction are the same.

The lower roller 59A is rotatably mounted to the roller shaft 67A. The axial direction of the lower roller 59A is parallel to the directions U, D. The lower roller 59B is rotatably mounted to the roller shaft 67B. The axial direction of the lower roller 59B is parallel to the directions U, D. The lower rollers 59A, 59B are arranged side by side at an interval along the direction X. The positions of the lower rollers 59A, 59B in the directions U, D are the same. The shapes of the lower rollers 59A, 59B are cylindrical. The diameters of the lower rollers 59A, 59B are the same. The lengths of the lower rollers 59A, 59B in the axial direction are the same.

The lower roller 59A is arranged on the downward direction D side of the upper roller 57A. The rotation axis of the lower roller 59A and the rotation axis of the upper roller 57A lie in a straight line. The upper roller 57A and the lower roller 59A are aligned along an axial direction parallel to the directions U, D. This axial direction is orthogonal to the direction R. The upper roller 57A and the lower roller 59A correspond to a roller unit. The diameter of the lower roller 59A is larger than the diameter of the upper roller 57A.

The lower roller 59B is arranged on the downward direction D side of the upper roller 57B. The rotation axis of the lower roller 59B and the rotation axis of the upper roller 57B lie in a straight line. The upper roller 57B and the lower roller 59B are aligned along an axial direction parallel to the directions U, D. This axial direction is orthogonal to the direction R. The upper roller 57B and the lower roller 59B correspond to a roller unit. Thus, the holding unit 23 comprises the roller unit consisting of the upper roller 57A and the lower roller 59A, and the roller unit consisting of the upper roller 57B and the lower roller 59B. The diameter of the lower roller 59B is larger than the diameter of the upper roller 57B.

As illustrated in FIG. 5 and FIG. 6, the cam follower 61 is mounted to a portion of the slide portion 53 on an inner peripheral side. The inner peripheral side is, as illustrated in FIG. 2, a direction, when seen from a viewpoint on the direction U side, toward the center of the annular rail unit 21. The cam follower 61 protrudes in the inner peripheral side farther than the slide portion 53. The cam follower 61 is inserted in the groove 35 of the upper rail 27 or the groove 35 of the lower rail 29.

As the upper chain 31 and the lower chain 33 rotate in the direction X, the holding unit 23 moves in the direction X. The holding unit 23 can go around the annular rail unit 21.

Sliding movement between the inner circumferential surface of the bush provided in the slide portion 53 and the outer circumferential surface of the shaft 51 enables the holding portion 23 to move in the directions U, D. The directions U, D are parallel to the axial directions of the upper rollers 57A, 57B and the lower rollers 59A, 59B.

However, when the cam follower 61 is inserted in the groove 35 of the upper rail 27, the position of the holding unit 23 in the directions U, D is determined by the upper rail 27. When the cam follower 61 is inserted in the groove 35 of the lower rail 29, the position of the holding unit 23 in the directions U, D is determined by the lower rail 29.

Hereinafter, a state in which the cam follower 61 is inserted in the groove 35 of the upper rail 27 will be referred to as an upward displacement state. A state in which the cam follower 61 is inserted in the groove 35 of the lower rail 29 will be referred to as a downward displacement state. In the upward displacement state, the holding unit 23 is located further on the direction U side than in the downward displacement state.

Figure 7:
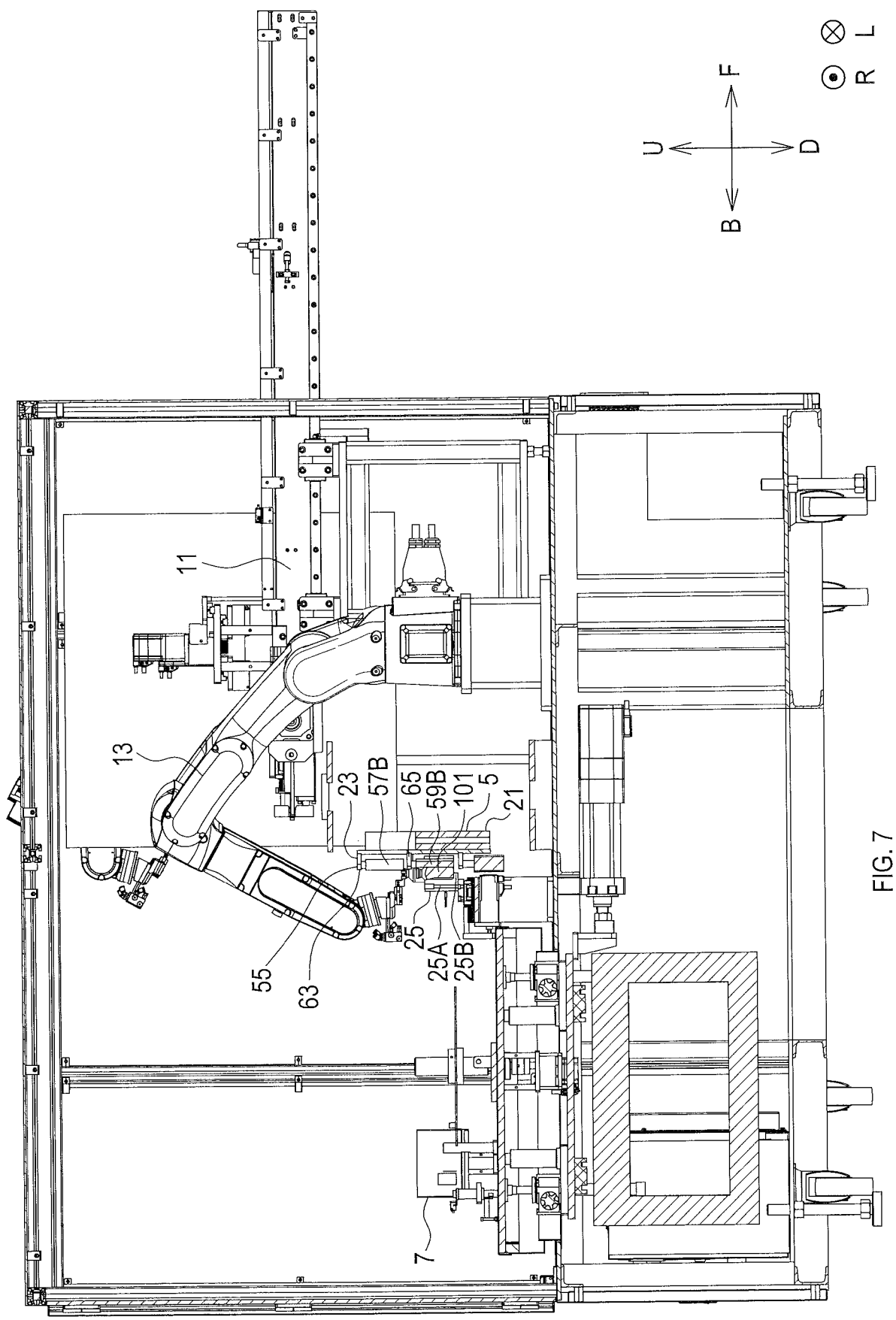
FIG. 7 is a vertical cross-sectional view illustrating a configuration of the rail unit 21, the holding unit 23, and a first guide 25.

As illustrated in FIG. 1, the first guide 25 is an elongated member extending parallel to the directions L, R. As illustrated in FIG. 1 and FIG. 7, the first guide 25 is arranged on the direction B side of the rail unit 21 and the holding unit 23. As illustrated in FIG. 7, the first guide 25 has, when seen from a viewpoint on the direction R side, an L-shape consisting of a side plate 25A and a bottom plate 25B. The side plate 25A extends parallel to the directions U, D. The bottom plate 25B extends from the lower end of the side plate 25A in the direction F.

In the upward displacement state, as illustrated in FIG. 7, the lower rollers 59A, 59B face the first guide 25. In the downward displacement state, the upper rollers 57A, 57B face the first guide 25. That is, the holding unit 23 moves in the directions U, D to thereby switch the rollers facing the first guide 25 between the upper rollers 57A, 57B and the lower rollers 59A, 59B.

The rotation axis of the upper roller 57A and the rotation axis of the lower roller 59A are both parallel to the directions U, D and lie in a straight line. The diameter of the lower roller 59A is larger than the diameter of the upper roller 57A. The rotation axis of the upper roller 57B and the rotation axis of the lower roller 59B are both parallel to the directions U, D and lie in a straight line. The diameter of the lower roller 59B is larger than the diameter of the upper roller 57B.

Thus, a distance between the first guide 25 and the lower rollers 59A, 59B in the upward displacement state is smaller than a distance between the first guide 25 and the upper rollers 57A, 57B in the downward displacement state.

Figure 12:
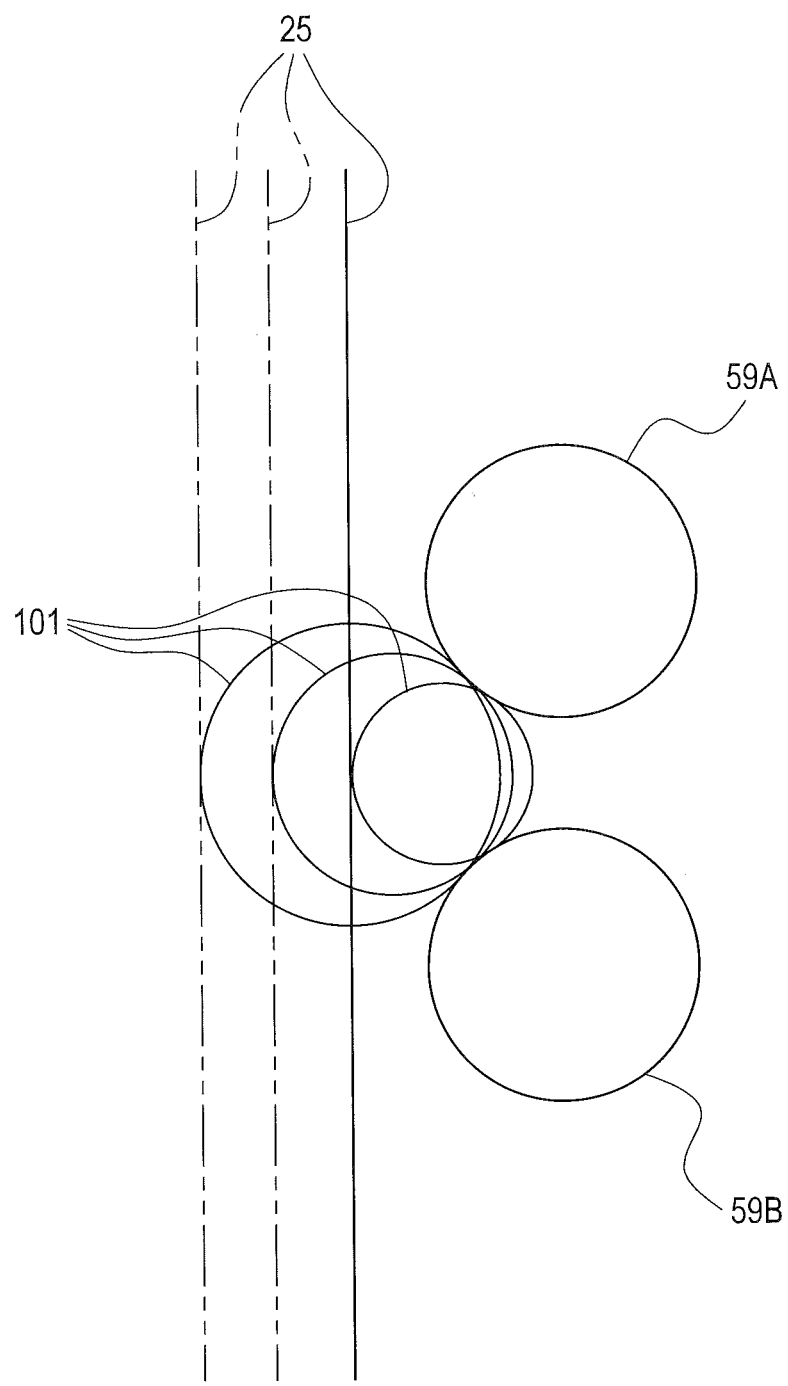
FIG. 12 is an explanatory view illustrating movement of the first guide 25.

As illustrated in FIG. 12, the first guide 25 can move in the directions F, B. The further the first guide 25 moves in the direction B, the more the first guide 25 separates from the upper rollers 57A, 57B or the lower rollers 59A, 59B. For example, the larger the diameter of containers to be transported is, the further the position of the first guide 25 may be moved toward the direction B side.

3. Process Performed by Transport Device 5

A process performed by the transport device 5 will be described. The container introduction device 3 introduces containers 101 to the introduction positions 15 in the transport device 5. The container 101 has, for example, a cylindrical body portion. The introduction positions 15 are positions located on the direction B side and the direction L side in the transport device 5. At the introduction positions 15, the holding unit 23 holds, as illustrated in FIG. 7, one container 101 between the holding unit 23 and the first guide 25.

Figure 8:
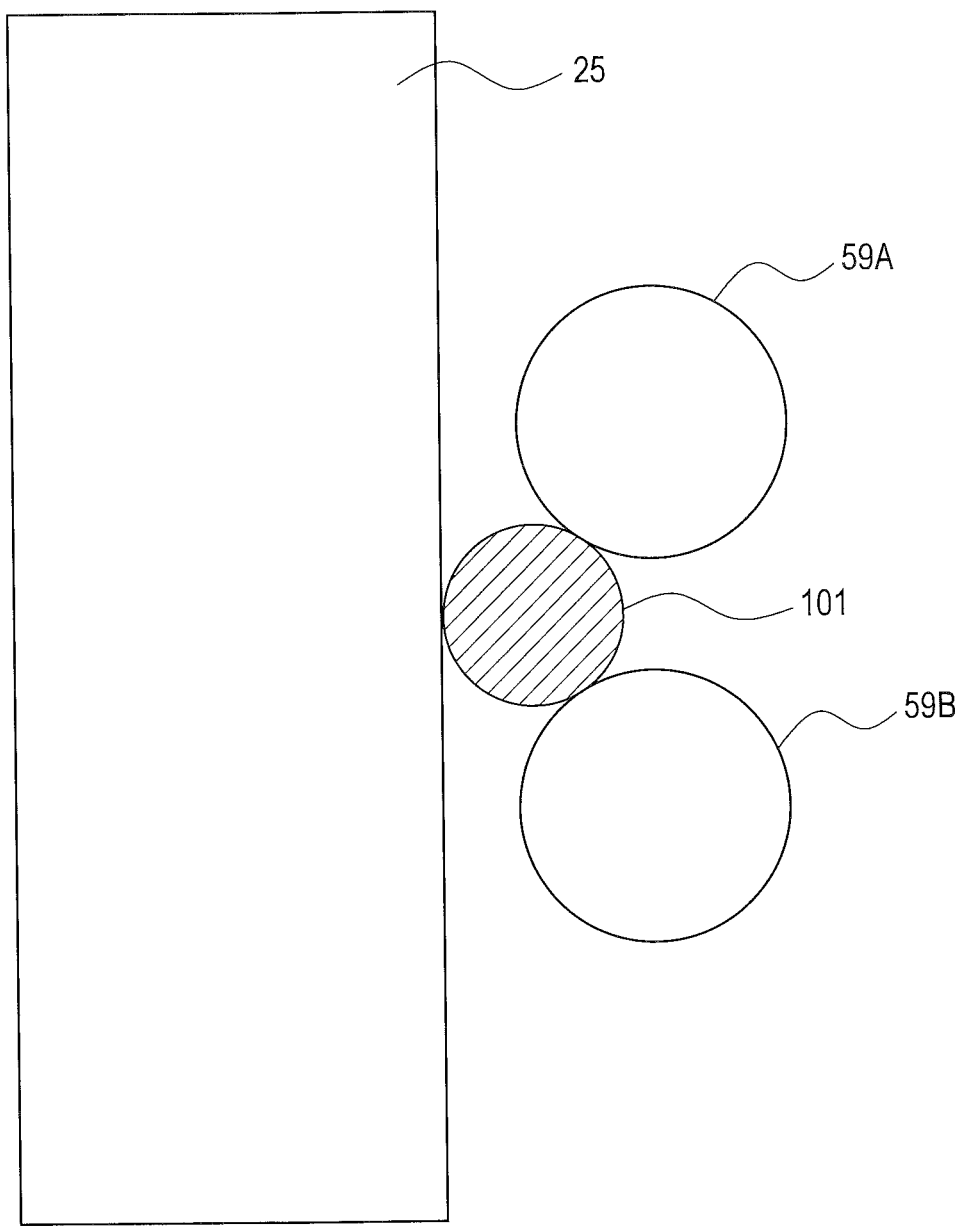
FIG. 8 is an explanatory view illustrating a state in which a container 101 is held by lower rollers 59A, 59B and the first guide 25.

In the upward displacement state, as illustrated in FIG. 7 and FIG. 8, the container 101 is held by the lower rollers 59A, 59B and the first guide 25. The lower rollers 59A, 59B abut a side surface of the container 101. The side plate 25A of the first guide 25 abuts the side surface of the container 101, and the bottom plate 25B supports a bottom surface of the container 101 from below. The lower rollers 59A, 59B and the side plate 25A hold the container 101 from both sides. The lower rollers 59A, 59B and the first guide 25 hold, for example, the cylindrical body portion of the container 101.

Figure 9:
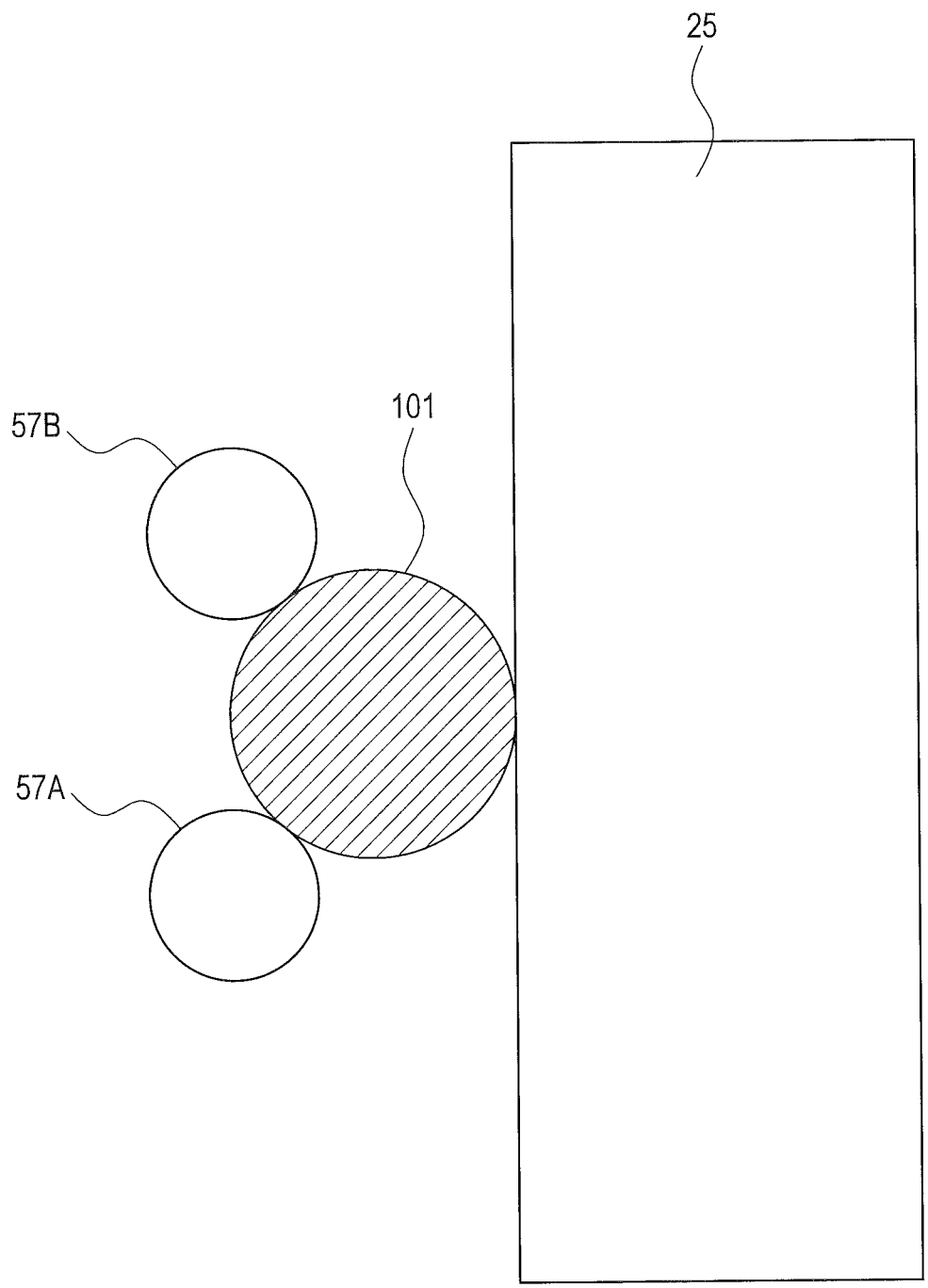
FIG. 9 is an explanatory view illustrating a state in which the container 101 is held by upper rollers 57A, 57B and the first guide 25.

In the downward displacement state, as illustrated in FIG. 9, the container 101 is held by the upper rollers 57A, 57B and the first guide 25. The upper rollers 57A, 57B abut the side surface of the container 101. The side plate 25A of the first guide 25 abuts the side surface of the container 101, and the bottom plate 25B supports the bottom surface of the container 101 from below. The upper rollers 57A, 57B and the side plate 25A hold the container 101 from both sides. The upper rollers 57A, 57B and the first guide 25 hold, for example, the cylindrical body portion of the container 101.

As mentioned above, the holding unit 23 moves in the directions U, D to thereby switch the rollers abutting the container 101 between the upper rollers 57A, 57B and the lower rollers 59A, 59B.

The holding unit 23, while holding the container 101, moves in the direction R. The container 101 slidingly moves along the surface of the first guide 25 in the direction R. By the process above, the transport device 5 transports the containers 101 in the direction R. The transport direction of the containers 101 is a direction along a straight line.

The transport device 5 can be switched from the upward displacement state to the downward displacement state as described below. In the upward displacement state, the cam follower 61 is inserted in the groove 35 of the upper rail 27. The position of the first stopper 451 of the first air cylinder 41 illustrated in FIG. 10 is set to the position where the groove 35 of the upper rail 27 is closed and the groove 35 of the path switching rail 37 is opened. Also, the position of the second stopper 452 of the second air cylinder 43 is set to the position where the groove 35 of the lower rail 29 is closed and the groove 35 of the path switching rail 37 is opened. The cam follower 61 travels from the upper rail 27 to the lower rail 29 via the path switching rail 37. As a result, the upward displacement state is switched to the downward displacement state.

In order to maintain the upward displacement state, the position of the first stopper 451 of the first air cylinder 41 illustrated in FIG. 10 is set to the position where the groove 35 of the upper rail 27 is opened and the groove 35 of the path switching rail 37 is closed. Also, the position of the second stopper 452 of the second air cylinder 43 is set to the position where the groove 35 of the lower rail 29 is opened and the groove 35 of the path switching rail 37 is closed. The cam follower 61 does not enter the path switching rail 37 and remains inserted in the groove 35 of the upper rail 27.

The transport device 5 can be switched from the downward displacement state to the upward displacement state as described below. In the downward displacement state, the cam follower 61 is inserted in the groove 35 of the lower rail 29. The position of the third stopper 453 of the third air cylinder 47 illustrated in FIG. 11 is set to the position where the groove 35 of the lower rail 29 is closed and the groove 35 of the path switching rail 39 is opened. Also, the position of the fourth stopper 454 of the fourth air cylinder 49 is set to the position where the groove 35 of the upper rail 27 is closed and the groove 35 of the path switching rail 39 is opened. The cam follower 61 travels from the lower rail 29 to the upper rail 27 via the path switching rail 39. As a result, the downward displacement state is switched to the upward displacement state.

In order to maintain the downward displacement state, the position of the third stopper 453 of the third air cylinder 47 illustrated in FIG. 11 is set to the position where the groove 35 of the lower rail 29 is opened and the groove 35 of the path switching rail 39 is closed. Also, the position of the fourth stopper 454 of the fourth air cylinder 49 is set to the position where the groove 35 of the upper rail 27 is opened and the groove 35 of the path switching rail 39 is closed. The cam follower 61 does not enter the path switching rail 39 and remains inserted in the groove 35 of the lower rail 29.

4. Configuration of Article Sorting Device 9

Figure 13:
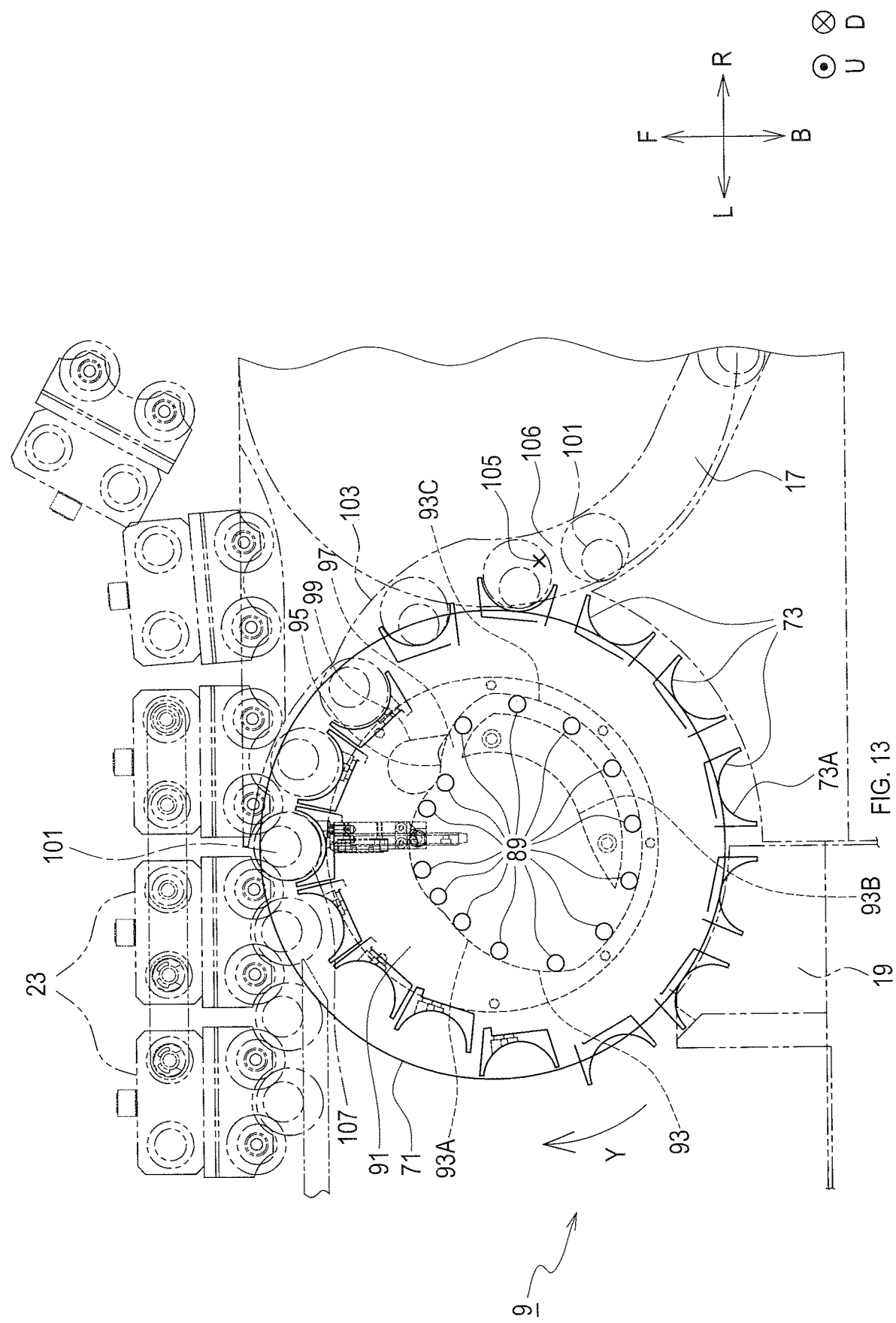
FIG. 13 is a plan view illustrating a configuration of an article sorting device 9 in a state in which a selection portion 99 opens a gap 97, and a cam follower 89 is in contact with a contacting surface 93C.
Figure 14:
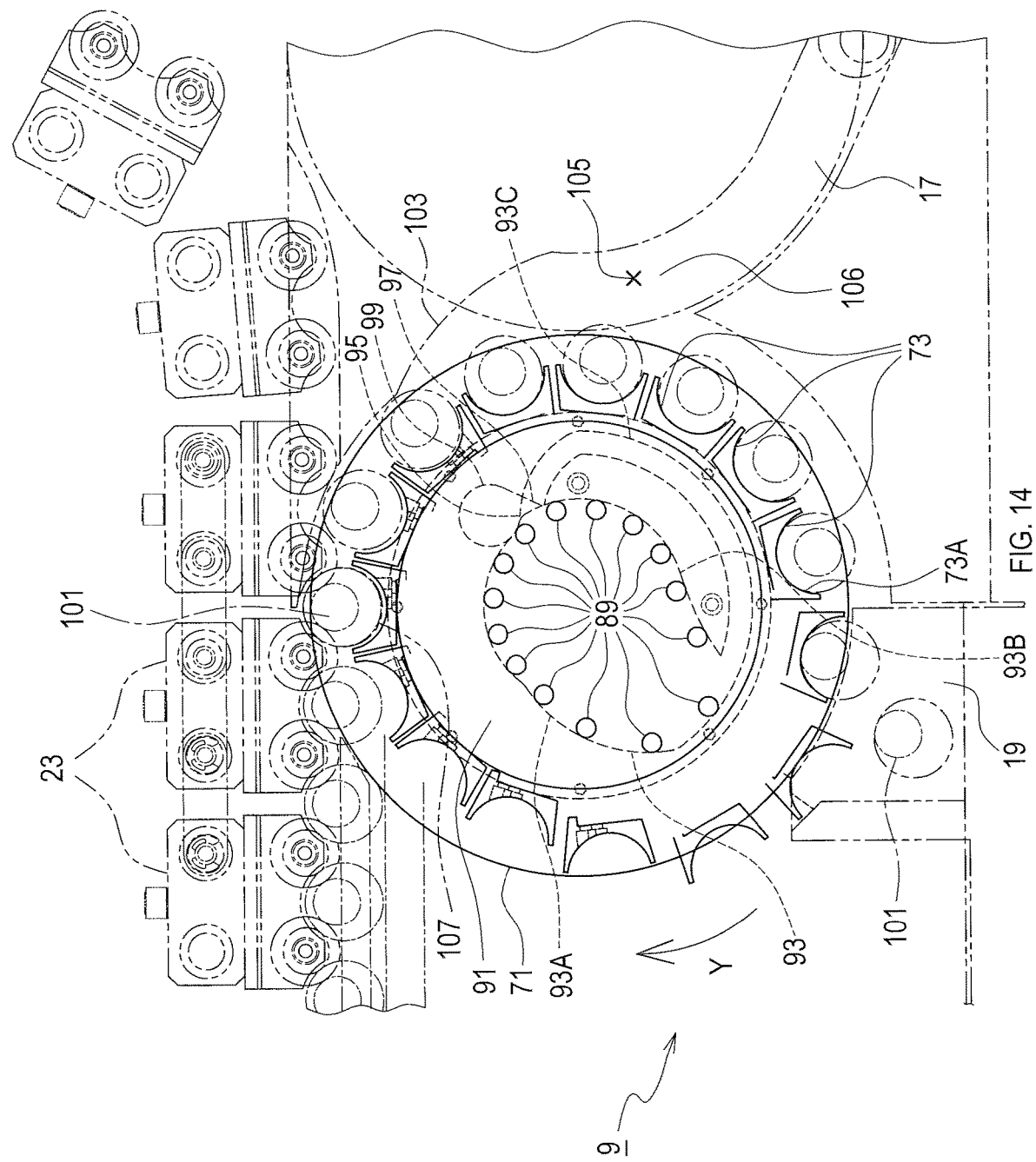
FIG. 14 is a plan view illustrating a configuration of the article sorting device 9 in a state in which the selection portion 99 closes the gap 97, and the cam follower 89 is in contact with a contacting surface 93B.
Figure 15:
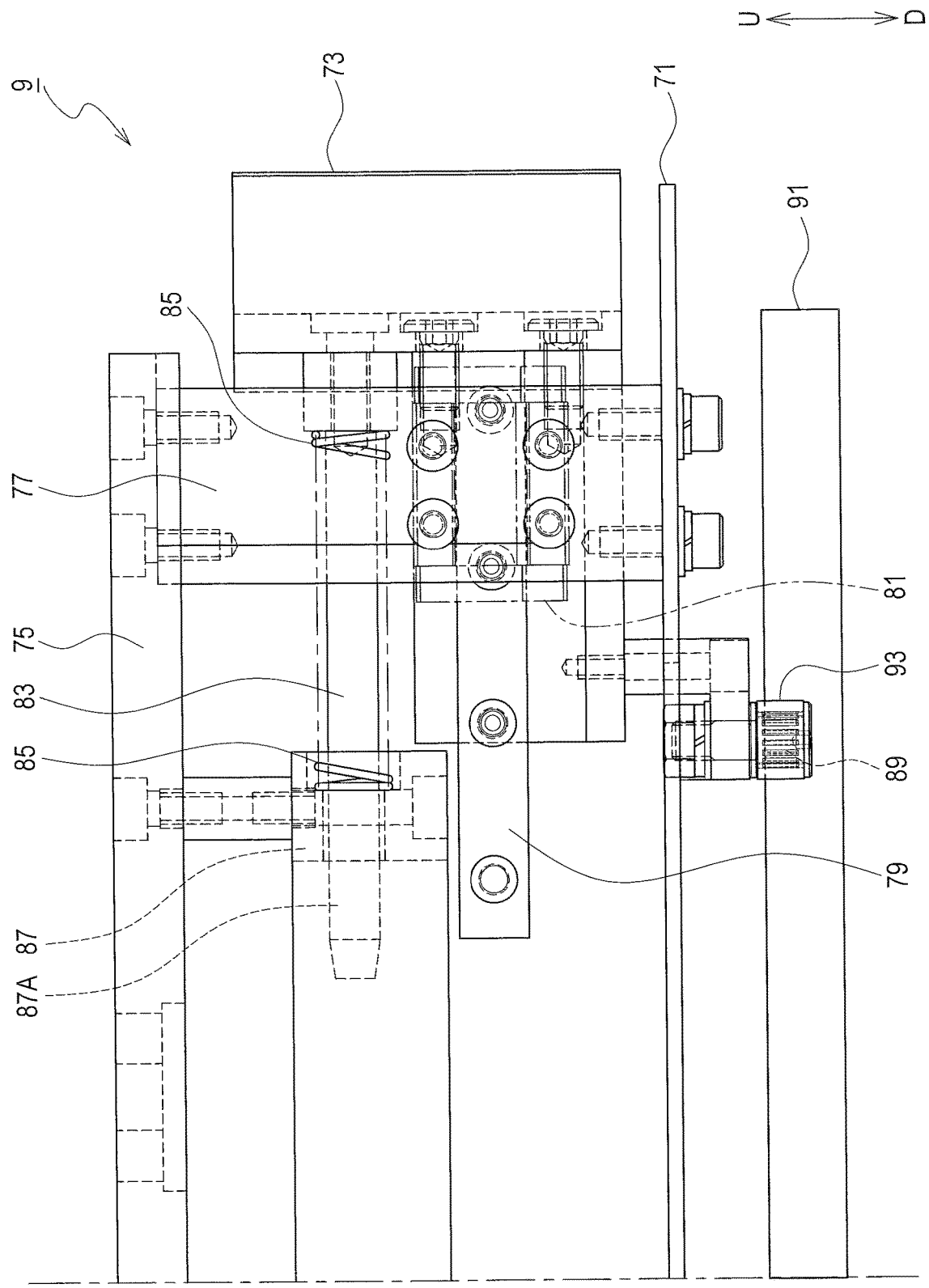
FIG. 15 is a sectional side view illustrating a configuration of the article sorting device 9.

A configuration of the article sorting device 9 will be described based on FIG. 13 to FIG. 15. As illustrated in FIG. 13 to FIG. 15, the article sorting device 9 comprises a rotating table 71. The rotating table 71 has a disc shape. A rotation axis of the rotating table 71 is parallel to the directions U, D. The rotating table 71 is rotatable in a direction Y illustrated in FIG. 13 and FIG. 14.

The article sorting device 9 includes two or more pockets 73. The two or more pockets 73 are mounted to an outer circumferential portion of the rotating table 71. The two or more pockets 73 are arranged side by side at equal intervals along the circumferential direction of the rotating table 71. The positions of the two or more pockets 73 in the radial direction are independently changeable with respect to the rotating table 71. The radial direction means the radial direction of the rotating table 71, unless otherwise specified.

Each pocket 73 is provided with a concave 73A on an outer side in the radial direction. As illustrated in FIG. 13 and FIG. 14, the concave 73A, when seen from a viewpoint on the direction U side, has an arc shape. With the concave 73A, the pocket 73 can hold the container 101. To hold means to restrict movement of the container 101 in at least the circumferential direction with respect to the pocket 73.

As illustrated in FIG. 15, the article sorting device 9 includes a top plate 75 and a support post 77. The top plate 75 is arranged on the direction U side of the rotating table 71 and the pocket 73. The support post 77 is interposed between the rotating table 71 and the top plate 75. The support post 77 secures the top plate 75 to the rotating table 71.

As illustrated in FIG. 15, the article sorting device 9 includes a rail 79 and a block 81 for each of the two or more pockets 73. The rail 79 is secured to the pocket 73, and extends radially inward from the pocket 73. The block 81 is secured to the support post 77. Thus, the position of the block 81 is fixed with respect to the rotating table 71.

The block 81 has a tubular shape. The hole of the block 81 extends along the radial direction. The rail 79 is inserted in the hole of the block 81. The rail 79 slidingly moves with respect to the block 81 to thereby change the radial position of the pocket 73 with respect to the rotating table 71.

As illustrated in FIG. 15, the article sorting device 9 includes a spring guide 83, a spring 85, and a spring receiving portion 87 for each of the two or more pockets 73. The spring guide 83 is a rod-shaped member. The spring guide 83 is secured to the pocket 73, and extends radially inward from the pocket 73. The spring 85 is a coiled spring. The spring guide 83 is inserted inside the spring 85. The spring 85 also extends radially inward from the pocket 73 similarly to the spring guide 83.

The spring receiving portion 87 is secured to the top plate 75. Thus, the position of the spring receiving portion 87 is fixed with respect to the rotating table 71. The spring receiving portion 87 is located radially inward relative to the pocket 73. The spring receiving portion 87 is provided with a guide receiving hole 87A. The guide receiving hole 87A is open on the outer face of the spring receiving portion 87 in the radial direction, and extends radially inward. The end of the spring guide 83 is inserted in the guide receiving hole 87A. The further the pocket 73 is moved radially inward, the deeper the spring guide 83 is inserted in the guide receiving hole 87A.

The radially outer end of the spring 85 is in contact with the pocket 73. The radially inner end of the spring 85 is in contact with the surrounding of the opening of the guide receiving hole 87A in the spring receiving portion 87. The spring 85 is compressed in the radial direction, and urges the pocket 73 radially outward.

As illustrated in FIG. 13 to FIG. 15, the article sorting device 9 comprises a cam follower 89 for each of the two or more pockets 73. Also, the article sorting device 9 comprises a cam 91. The cam follower 89 is secured to the rail 79. Thus, the pocket 73 moves together with the cam follower 89. The cam follower 89 protrudes in the direction D side farther than the rail 79 and the rotating table 71.

The cam 91 is located on the direction D side of the rotating table 71. The cam 91 is secured to the body of the article sorting device 9. The cam 91 comprises a contacting surface 93 in contact with the cam followers 89. The contacting surface 93 is a surface in contact with the cam followers 89 from the outer side in the radial direction. The basic shape of the contacting surface 93, when seen from a viewpoint on the direction U side, is an arc shape.

The cam follower 89 together with the pocket 73 is urged radially outward by the spring 85, and thus is in contact with the contacting surface 93. The radial position of the pocket 73 is determined by the position of the contacting surface 93 in contact with the cam follower 89.

Proceeding along the contacting surface 93 in the direction Y, there is only one contacting surface 93 (hereinafter, referred to as a contacting surface 93A) up to a branch position 95. At the branch position 95, the contacting surface 93 branches into a contacting surface 93B and a contacting surface 93C. The contacting surface 93C is located radially outward relative to the contacting surface 93B. The contacting surface 93C continues to the contacting surface 93A. Between the contacting surface 93B and the contacting surface 93A, there is a gap 97 larger than the width of the cam follower 89.

As illustrated in FIG. 13 to FIG. 14, the article sorting device 9 comprises a selection portion 99. As illustrated in FIG. 13, the selection portion 99 can be moved to a position where the gap 97 is opened. When the selection portion 99 opens the gap 97, the cam follower 89 enters the gap 97 at the branch position 95, and proceeds to the path to come into contact with the contacting surface 93C.

As illustrated in FIG. 14, the selection portion 99 can be moved to a position where the gap 97 is closed. When the selection portion 99 closes the gap 97, the cam follower 89 moves over the selection portion 99 and the gap 97 at the branch position 95, and proceeds to the path to come into contact with the contacting surface 93B.

As illustrated in FIG. 13 and FIG. 14, the article sorting device 9 comprises a second guide 103. The second guide 103 is located radially outward relative to the pocket 73. The shape of the surface of the second guide 103, when seen from a viewpoint on the direction U side, is an arc shape. The second guide 103 inhibits the container 101 held by the pocket 73 from falling from the pocket 73. The second guide 103 has a gap 106 at a sorting position 105. The gap 106 is connected to the passage 17 for defective products. The passage 17 for defective products extends radially outward from the gap 106.

5. Process Performed by Article Sorting Device 9

A process performed by the article sorting device 9 will be described. A randomly selected pocket 73 will be focused here. All the pockets 73 can perform the same operation. The rotating table 71 rotates in the direction Y at a constant speed. The pocket 73 also rotates in the direction Y at a constant speed. When the circumferential position of the pocket 73 comes to an introduction position 107 illustrated in FIG. 13 and FIG. 14, the holding unit 23 introduces the transported container 101 into the pocket 73. That is, the introduction position 107 is a position where the container 101 is introduced into the pocket 73. The pocket 73 holds the introduced container 101. The second guide 103 inhibits the container 101 from falling from the pocket 73.

When the circumferential position of the pocket 73 is at the introduction position 107, the cam follower 89 is in contact with the contacting surface 93A. The cam follower 89 remains in contact with the contacting surface 93A until the pocket 73 further rotates in the direction Y and reaches the branch position 95.

When the cam follower 89 reaches the branch position 95, if the container 101 held by the pocket 73 is a non-defective product, the selection portion 99 closes the gap 97 as illustrated in FIG. 14. The labeling system 1 comprises, for example, a microcomputer, a sensor, and an actuator. The microcomputer determines, using the sensor, whether the container 101 held by the pocket 73 is a non-defective product. If the container 101 held by the pocket 73 is determined to be a non-defective product, the microcomputer moves, using the actuator, the selection portion 99 to the position where the gap 97 is closed.

In a case where the selection portion 99 closes the gap 97, as the pocket 73 further rotates in the direction Y, the cam follower 89 moves over the selection portion 99 and the gap 97 and proceeds while being in contact with the contacting surface 93B. When the cam follower 89 proceeds while being in contact with the contacting surface 93B, the radial position of the pocket 73 is radially inward relative to the position when the cam follower 89 proceeds while being in contact with the contacting surface 93C. The radial position of the pocket 73 when the cam follower 89 proceeds while being in contact with the contacting surface 93B corresponds to a first position.

In a state in which the cam follower 89 is in contact with the contacting surface 93B, as the pocket 73 further rotates in the direction Y, the pocket 73 reaches the sorting position 105 and passes the sorting position 105. Since the position of the pocket 73 is located radially inward, the container 101 held in the pocket 73 does not proceed to the passage 17 for defective products and remains held in the pocket 73.

As the pocket 73 further rotates in the direction Y, the pocket 73 reaches the table 19 for non-defective products. The container 101 held in the pocket 73 is guided to the table 19 for non-defective products. As the pocket 73 further rotates in the direction Y, the empty pocket 73 reaches the introduction position 107 again.

On the other hand, when the cam follower 89 reaches the branch position 95, if the container 101 held by the pocket 73 is a defective product, the selection portion 99 opens the gap 97 as illustrated in FIG. 13. The labeling system 1 comprises, for example, the microcomputer, the sensor, and the actuator. The microcomputer determines, using the sensor, whether the container 101 held by the pocket 73 is a non-defective product. If the container 101 held by the pocket 73 is determined to be a defective product, the microcomputer moves, using the actuator, the selection portion 99 to the position where the gap 97 is opened.

In a case where the selection portion 99 opens the gap 97, as the pocket 73 further rotates in the direction Y, the cam follower 89 being urged radially outward enters the gap 97 and proceeds while being in contact with the contacting surface 93C. When the cam follower 89 proceeds while being in contact with the contacting surface 93C, the radial position of the pocket 73 is radially outward relative to the position when the cam follower 89 proceeds while being in contact with the contacting surface 93B. The radial position of the pocket 73 when the cam follower 89 proceeds while being in contact with the contacting surface 93C corresponds to a second position.

In a state in which the cam follower 89 is in contact with the contacting surface 93C, as the pocket 73 further rotates in the direction Y, the pocket 73 reaches the sorting position 105 and passes the sorting position 105. Since the position of the pocket 73 is located radially outward, the container 101 held in the pocket 73 passes through the gap 106 to be pushed into the passage 17 for defective products. As the pocket 73 further rotates in the direction Y, the empty pocket 73 reaches the introduction position 107 again.

6. Effects Achieved by Conveyor Device 5

(1A) The transport device 5 can be set to the upward displacement state and the downward displacement state. The distance between the first guide 25 and the lower rollers 59A, 59B in the upward displacement state is smaller than the distance between the first guide 25 and the upper rollers 57A, 57B in the downward displacement state.

In a case where, for example, containers to be transported are large, the transport device 5 can be set to the downward displacement state so as to increase the distance between the first guide 25 and the upper rollers 57A, 57B. Moreover, in a case where, for example, containers to be transported are small, the transport device 5 can be set to the upward displacement state so as to reduce the distance between the first guide 25 and the lower rollers 59A, 59B. Thus, the transport device 5 can transport two or more types of containers without necessarily requiring a change of parts.

(1B) The holding unit 23 can move in the directions U, D. The transport device 5 transports the containers in the direction R. Thus, the holding unit 23 can move in a direction orthogonal to the transport direction of containers. Accordingly, the transport device 5 can efficiently perform switchover from the upward displacement state to the downward displacement state and switchover from the downward displacement state to the upward displacement state.

(1C) The first guide 25 is movable in the direction toward the holding unit 23 or the direction away from the holding unit 23. The transport device 5 moves the first guide 25 to thereby enable adjustment of the distance between the first guide 25 and the holding unit 23 depending on the containers to be transported.

(1D) The transport direction in which the transport device 5 transports the containers is a direction along a straight line. Thus, the transport device 5 can efficiently transport containers.

(1E) The transport device 5 is part of the labeling system 1. Thus, the labeling system 1 can transport two or more types of containers without necessarily requiring a change of parts.

7. Effects Achieved by Article Sorting Device 9

(1F) The article sorting device 9 controls the radial position of the pocket 73 to a specified position that is the first position or the second position from when the circumferential position of the pocket 73 passes the introduction position 107 to when the position reaches the sorting position 105. The first position is the position of the pocket 73 when the cam follower 89 proceeds while being in contact with the contacting surface 93B. The second position is the position of the pocket 73 when the cam follower 89 proceeds while being in contact with the contacting surface 93C.

The article sorting device 9 guides the container 101 to different paths depending on whether the radial position of the pocket 73 is at the first position or the second position when the circumferential position of the pocket 73 reaches the sorting position 105.

That is, the article sorting device 9 guides the container 101 to the path to the table 19 for non-defective products in a case where the radial position of the pocket 73 is at the first position when the circumferential position of the pocket 73 reaches the sorting position 105. The article sorting device 9 guides the container 101 to the passage 17 for defective products via the gap 106 in a case where the radial position of the pocket 73 is at the second position when the circumferential position of the pocket 73 reaches the sorting position 105. The second guide 103, the gap 106, and the passage 17 for defective products correspond to a sorting unit.

The article sorting device 9 can sort various containers 101 into non-defective products and defective products without necessarily requiring a change of parts.

(1G) The article sorting device 9 comprises the cam followers 89, the cam 91, and the selection portion 99. The cam follower 89 is secured to the pocket 73. The cam 91 is in contact with the cam followers 89. The contacting surface 93B of the cam 91 guides the cam follower 89 such that the radial position of the pocket 73 is brought to the first position. The contacting surface 93C of the cam 91 guides the cam follower 89 such that the radial position of the pocket 73 is brought to the second position. The selection portion 99 selects the contacting surface 93B or the contacting surface 93C to be brought into contact with the cam follower 89. The contacting surface 93B corresponds to a first portion. The contacting surface 93C corresponds to a second portion.

The article sorting device 9 controls the radial position of the pocket 73 to a specified position that is the first position or the second position using the cam follower 89, the cam 91, and the selection portion 99. Thus, the article sorting device 9 can control the radial position of the pocket 73 with a simple configuration. The cam followers 89, the cam 91, and the selection portion 99 correspond to a position control unit.

(1H) The article sorting device 9 is part of the labeling system 1. Thus, the labeling system 1 can sort various containers 101 into non-defective products and defective products without necessarily requiring a change of parts.

Other Embodiments

Although an embodiment of the present disclosure has been described above, the present disclosure should not be limited to the above-described embodiment, and can be embodied in variously modified forms.

(1) The article sorting device 9 may be a device that sorts articles other than containers.

(2) The article sorting device 9 may be part of a system other than the labeling system 1.

(3) The article sorting device 9 may open the gap 97 as illustrated in FIG. 13, when the container 101 held by the pocket 73 is a non-defective product. In this case, the non-defective product is pushed into the path 17 for defective products. The article sorting device 9 may close the gap 97 as illustrated in FIG. 14, when the container 101 held by the pocket 73 is a defective product. In this case, the defective product is guided onto the table 19 for non-defective products.

(4) The cam 91 may be secured to the pocket 73, and the cam follower 89 may be secured to the body of the article sorting device 9.

(5) The holding unit 23 may comprise a roller unit in which three or more rollers are aligned in an axial direction. The three or more rollers may have different diameters respectively, for example. Examples of the number of rollers aligned in an axial direction comprise 3, 4, 5, 6, 7, and so on.

(6) In the first embodiment, the holding unit 23 comprises two roller units. The number of the roller units provided in the holding unit 23 may be three or more.

(7) The transport device 5 may transport the containers along a partly or wholly curved transport path.

(8) The diameter of the upper rollers 57A, 57B may be larger than the diameter of the lower rollers 59A, 59B.

(9) A function or functions of one component in each of the aforementioned embodiments may be assigned to two or more components, or a function or functions of two or more components may be achieved by one component. Furthermore, part of the configurations of each of the aforementioned embodiments may be omitted. Moreover, addition, replacement and so on of at least part of the configurations of each of the aforementioned embodiments may be performed with respect to other configurations of the aforementioned embodiments.

(10) In addition to the article sorting device described above, the present disclosure can be achieved in various forms such as a system having the article sorting device as a component, a program for enabling a computer to function as part of the article sorting device, a non-transitory tangible storage medium such as a semiconductor memory in which the program is recorded, and a method of sorting articles.

What is claimed is:
1. An article sorting device comprising:
a rotating table;
a pocket mounted to an outer circumferential portion of the rotating table such that a radial position of the pocket is changeable, and configured to hold an article;
a guide located radially outward relative to the pocket, and configured to inhibit the article from falling from the pocket;
a position control unit configured to control the radial position of the pocket to a specified position that is a first position or a second position located radially outward relative to the first position from when a circumferential position of the pocket passes an introduction position where the article is introduced into the pocket to when the position reaches a sorting position;
a sorting unit configured to guide the article to different paths depending on whether the radial position of the pocket is at the first position or the second position when the circumferential position of the pocket reaches the sorting position;
a cam follower secured to the pocket; and
a cam in contact with the cam follower,
wherein the position control unit comprises:
the cam follower;
a first portion that is a portion of the cam that guides the cam follower such that the radial position of the pocket is brought to the first position;
a second portion that is a portion of the cam that guides the cam follower such that the radial position of the pocket is brought to the second position; and
a selection portion that selects the first portion or the second portion to be brought into contact with the cam follower.

2. The article sorting device according to claim 1, wherein the article is a container, and
wherein the article sorting device is part of a labeling system configured to attach a label to the container.

3. The article sorting device according to claim 2, wherein the position control unit is configured to control the position of the pocket, into which the container with the label properly attached is introduced, to one of the first position or the second position, and control the position of the pocket, into which the container with the label improperly attached is introduced, to the other of the first position or the second position.

4. The article sorting device according to claim 3,
wherein the position control unit is configured to be changeable to control the position of the pocket, into which the container with the label properly attached is introduced, to the other of the first position or the second position, and control the position of the pocket, into which the container with the label improperly attached is introduced, to the one of the first position or the second position.

5. The article sorting device according to claim 1,
wherein the different paths comprise a first path if the radial position of the pocket is at the first position when the circumferential position of the pocket reaches the sorting position, and a second path if the radial position of the pocket is at the second position when the circumferential position of the pocket reaches the sorting position, the second path being different from the first path.

6. The article sorting device according to claim 1,
wherein the first portion and the second portion radially overlap each other.

7. The article sorting device according to claim 1,
wherein the first portion and the second portion radially overlap each other, the second portion being arranged radially outside of the first portion.

8. The article sorting device according to claim 1,
wherein the selection portion is movable relative to the cam.

9. The article sorting device according to claim 1,
wherein the selection portion is movable relative to the cam follower.

\* \* \* \* \*